United States Patent [19]

Brandt et al.

[11] Patent Number: 4,920,838

[45] Date of Patent: May 1, 1990

[54] METHOD OF CUTTING WITH CERAMIC CUTTING TOOL HAVING IMPROVED TOUGHNESS BEHAVIOR

[75] Inventors: Nils G. L. Brandt, Solna; Anders G. Thelin, Vällingby, both of Sweden

[73] Assignee: Sandvik AB, Sandviken, Sweden

[21] Appl. No.: 349,094

[22] Filed: May 9, 1989

Related U.S. Application Data

[62] Division of Ser. No. 201,931, Jun. 3, 1988, Pat. No. 4,849,381.

[30] Foreign Application Priority Data

Jun. 9, 1987 [SE] Sweden ................................ 8702391
Jun. 9, 1987 [SE] Sweden ................................ 8702392

[51] Int. Cl.$^5$ ............................................... B23C 1/00
[52] U.S. Cl. ....................................... 82/1.11; 407/119; 409/131; 408/112; 408/144; 408/145; 501/95
[58] Field of Search ......................... 82/1.11; 407/119; 409/131; 408/112, 144, 145; 501/92, 89, 95, 128; 51/307, 309

[56] References Cited

U.S. PATENT DOCUMENTS

| | | | |
|---|---|---|---|
| 4,543,345 | 9/1985 | Wei | 501/91 X |
| 4,652,413 | 3/1987 | Trigs | 501/95 X |
| 4,657,877 | 4/1987 | Becher et al. | 501/95 X |
| 4,673,658 | 6/1987 | Gadkaree et al. | 501/95 X |
| 4,767,727 | 8/1988 | Claussen et al. | 501/92 X |
| 4,774,209 | 9/1988 | Gadkaree et al. | 501/95 X |
| 4,789,277 | 12/1988 | Rhodes et al. | 501/95 X |
| 4,801,564 | 1/1989 | Baba | 501/92 |

FOREIGN PATENT DOCUMENTS

| | | | |
|---|---|---|---|
| 0054680 | 3/1984 | Japan | 501/95 |
| 0200863 | 10/1985 | Japan | 501/95 |

OTHER PUBLICATIONS

Milewski, "Efficient Use of Whiskers in the Reinforcement of Ceramics", Advanced Ceramic Materials, vol. I, No. I (1986), pp. 36-41.

*Primary Examiner*—Mark L. Bell
*Assistant Examiner*—Karl Group
*Attorney, Agent, or Firm*—Burns, Doane, Swecker & Mathis

[57] ABSTRACT

This invention relates to a cutting tool material with improved toughness behavior. The improved toughness behavior is obtained by using carefully selected reinforcing materials. The objectives of this invention are realized by simultaneously utilizing additives resulting in different toughenings mechanisms. By the simultaneous utilization of different toughening additives, synergistic effects occur giving the tool excellent material properties. The tool material of the present invention comprises reinforcing whisker additives of one dimensional single crystals with preferably different diameter and aspect ratios, two dimensional single crystals with different thickness and aspect ratios, and, in combination therewith, phase transformation additives such as $ZrO_2$.

10 Claims, No Drawings

METHOD OF CUTTING WITH CERAMIC CUTTING TOOL HAVING IMPROVED TOUGHNESS BEHAVIOR

This application is a divisional of application Ser. No. 201,931, filed June 3, 1988, U. S. Pat. No. 4,849,381.

The present invention relates to a cutting tool material. More speicially, the present invention relates to a cutting tool material exhibiting excellent toughness through the utilisation of different toughening additives.

A metal cutting tool is subjected to fluctuating stresses and temperatures of dynamic nature. The conditions to which a cutting edge is subjected in operation are severe, the temperature of the tool surface often exceeding 1000° C. as the chip contacts the rake face of the tool at a pressure close of 150 MPa and at a relative speed in the range 0-1000 mmin$^{-1}$. Steep temperature and stress gradients also exist in the cutting tool inserts. A consequence of the dynamic conditions described above is that generally several different failure mechanisms operate simultaneously for given cutting conditions. However, for a specific set of cutting data, one mechanism is dominating and limiting of the tool life.

One objective of the present invention is to obtain a cutting tool material having a unique combination of good resistance against several failure mechanisms. The result is a tool material showing improved tool life and wider application area.

Known toughening mechanisms in cutting tool materials include i) transformation toughening, which utilises a phaes transformation of $ZrO_2$-particles dispersed in a ceramic matrix, this type of material is described in U.S. Pat. No. 4,218,253; ii) whisher pull out which utilises the bridging effect of small diameter (typically 0.06/um), high aspect ratio and high strength single crystal whiskers in a ceramic matrix as described in U.S. Pat. No. 4,543,345, and the combined effect of $ZrO_2$ and small diameter SiC-whisker as described in U.S. Pat. No. 4,657,877.

Both of these effects have led to substantial improvements of the toughness behaviour in certain metal cutting operations. However, the search for greater improvements in the properties of cutting tools is continuously ongoing.

The primary objective of the present invention is to provide a material with an improved toughness behaviour and a wider application area than has heretofore been known. This objective is achieved through the simultaneous action of several toughening mechanisms. In different practical machining tests, it has been found that the maximum tool life is dependent on signle crystal size and geometry of the reinforcing additives for a specified operation. Therefore, a particular prior art material has a relative narrow optimum application area. It has now surprisingly been found that by adding several different classes of reinforcing single crystals, with respect to geometry and size, not only a widening of the application area is obtained but also an improvement in tool life is realised.

Generally, the present invention is directed to the fabrication of whisker-reinforced ceramic cutting tool materials characterised by increased tool life and a wider application area that prior art materials. The composites comprises a matrix based on $Al_2O_3$ or $Si_3N_4$ and up to 35 weight-% single crystals or whiskers with different geometries and sizes. Preferably an adequate concentration (in the alumina based matrix preferably 3-20, most preferably 5-15 weight% and in the silicon nitride based matrix up to 10 weight-%) of unstablized and/or partially stabilized zirconia increases the toughness behaviour of the composite in a wider range of metal cutting applications that obtainable with only one of the additives mentioned above. The alumina based matrix may further comprise chromium in amounts corresponding to a total of 1-20 weight-% as $Cr_2O_3$. The whiskers, preferably of SiC, used in the present invention are of a monocrystalline structure and are divided into three types characterized by different diameters and aspect (length/diameter or e.g., diameter/thickness) ratios at least 5 weight-% of each of at least two of the three types being present in the matrix:

(i) Single crystral fibers with a diameter less than 1/um, typically 0.6/um, and an aspect ratio of 15-150;

(ii) Single crystal fibers with a diameter of 1-6/um, typically 3-4/um, and an aspect ratio of 5-100; and (iii) Single crystal discs with an equivalent diameter (hypothetical diameter of a circle with the same area as the disc) of 5-50/um, typically 20/um and an aspect ratio (aspect ratio being defined as ratio of equivalent diameter through thickness of the disc) of 5-50, typically 10-20.

The composite may further comprise refractory nitrides or carbides to increase hot hardness and thermal conductivity which is advantageous in certain metal cutting applications.

EXAMPLE 1

Cutting tool materials are prepared from the following starting materials:

A. Alumina with a grain size ≦1/um;

B. SiC-single crystal with average diameter of 0.6/um and average aspect ratio 60;

C. SiC-single crystal with average diameter of 4/um and average aspect ratio 10;

D. SiC-single crystal with average equivalent diameter of 20/um and aspect ratio 10;

E. $ZrO_2$ with a grain size <2/um.

The SiC-single crystals are dispersed and wet milled with alumina powder. After drying, the mixture is hot pressed at 1725° C. for 60 min., and then with $ZrO_2$ at 1650° C. for 60 min. to 99.6 % of theoretical density. The composition variants are shown in Table 1.

TABLE 1

| Var. | A | Composition weight percent | | | | |
|---|---|---|---|---|---|---|
| | | B | C | D | E | |
| 1 | bal | 24 | 0 | 0 | 0 | prior art |
| 2 | bal | 24 | 0 | 0 | 10 | prior art |
| 3 | bal | 0 | 24 | 0 | 10 | own application |
| 4 | bal | 8 | 8 | 8 | 10 | invention |
| 5 | bal | 8 | 8 | 8 | 0 | invention |
| 6 | bal | 12 | 12 | 0 | 10 | invention |

EXAMPLE 2

The materials from Example 1 are tested as inserts SNGN 120412 in cast iron SS 0125 in an interrupted facing operation with high toughness demands. The following tool life ranking is obtained for different cutting conditions (Table 2).

TABLE 2

| Tool Life Ranking for Various Cutting Conditions | | | | |
|---|---|---|---|---|
| Cutting speed, mmin$^{-1}$ | 400 | 400 | 700 | 700 | Total |

TABLE 2-continued

| Tool Life Ranking for Various Cutting Conditions | | | | | |
|---|---|---|---|---|---|
| Feed rate, mmrev$^{-1}$ | 0.3 | 0.5 | 0.3 | 0.5 | Ranking |
| Variant | | | | | |
| 1 | 6 | 6 | 6 | 6 | 24 |
| 2 | 5 | 5 | 4 | 5 | 19 |
| 3 | 4 | 4 | 5 | 4 | 17 |
| 4 | 1 | 2 | 2 | 1 | 6 |
| 5 | 3 | 3 | 1 | 3 | 10 |
| 6 | 2 | 1 | 2 | 2 | 7 |

The results shows that variants 4, 5 and 6 according to the present invention utilise multiple toughening mechanisms and are superior to the prior art variants.

EXAMPLE 3

Inserts SNGN 120412 made according to Example 2 are tested in a continuous turning operation of cast iron SS 0125 with high demands of wear resistance (at a cutting speed of 700 mmin$^{-1}$ and a feed rate of 0.3 mmrev$^{-1}$). The relative tool life ranking is shown in Table 3.

TABLE 3

| Variant | 1 | 2 | 3 | 4 | 5 | 6 |
|---|---|---|---|---|---|---|
| Relative Ranking | 2 | not tested | | 4 | 1 | 3 |

The results shows that improved toughening with ZrO$_2$ additives results in a reduction of wear resistance.

We claim:

1. In a method of cutting metal wherein a cutting tool is brought into contact with a metal workpiece and at least one of the cutting tool and metal workpiece moves relative to the other whereby metal is removed from the workpiece, the improvement which comprises using as the tool a whisker reinforced ceramic cutting tool material characterized by increased toughness behaviour over a wide range of metal cutting applications, consisting essentially of a composite defined by a matrix of silicon nitride or alumina with up to 35 weight % whiskers homogeneously dispersed therein, said whiskers having a monocrystalline structure and said composite being characterized in that it has at least 5 weight % of each of at least two of three whisker single crystals characterized by geometry and size range as follows:

(i) single crystal fibers with a diameter less than 1 μm and an aspect ratio of 15-150;

(ii) single crystal fibers with a diameter of 1-6 μm and an aspect ratio of 5-100; and (iii) single crystal discs with an equivalent diameter of 5-50 μm and an aspect ratio of 5-50.

2. In the method of cutting metal claimed in claim 1, characterized in that the matrix consists essentially of alumina, and zirconia in the range of 3 to 20 weight % and chromium in amounts corresponding to a total of up to 20 weight-% as Cr$_2$O$_3$.

3. In the method of cutting metal claimed in claim 1, characterized in that the matrix consists essentially of silicon nitride and zirconia in an amount of less than 10 weight %.

4. In the method of cutting metal claimed in claim 1, characterized in that the whisker material is silicon carbide.

5. In the method of cutting metal claimed in claim 2, characterized in that the whisker material is silicon carbide.

6. In the method of cutting metal claimed in claim 3, characterized in that the whisker material is silicon carbide.

7. In the method of cutting metal claimed in claim 1, wherein the single crystal fibers have a diameter of about 0.6 μm and an aspect ratio of 15-150.

8. In the method of cutting metal claimed in claim 1, wherein the single crystal fibers have a diameter of 3-4 μm and an aspect ratio of 5-100.

9. In the method of cutting metal claimed in claim 1, wherein the single crystal discs have an equivalent diameter of about 20 μm and an aspect ratio about 10-20.

10. In the method of cutting metal claimed in claim 1, wherein the matrix consists essentially of alumina and zirconia in an amount of from 5-15 weight %.

* * * * *